United States Patent
Crittenden

(10) Patent No.: US 8,567,814 B2
(45) Date of Patent: Oct. 29, 2013

(54) PATTERNED WEAKENING OF AIRBAG COVERINGS

(75) Inventor: Carl Crittenden, Flushing, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/111,287

(22) Filed: May 19, 2011

(65) Prior Publication Data

US 2012/0292892 A1    Nov. 22, 2012

(51) Int. Cl.
*B60R 21/2165*    (2011.01)
*B60R 21/215*    (2011.01)

(52) U.S. Cl.
USPC ........................................ 280/728.3; 280/732

(58) Field of Classification Search
USPC ................................ 280/728.3, 732
See application file for complete search history.

(56) References Cited

U.S. PATENT DOCUMENTS

| | | | | |
|---|---|---|---|---|
| 5,084,122 | A * | 1/1992 | Fukushima et al. | 156/252 |
| 5,346,249 | A * | 9/1994 | Hallard et al. | 280/728.3 |
| 5,460,401 | A * | 10/1995 | Gans et al. | 280/728.3 |
| 5,499,841 | A * | 3/1996 | Trojan et al. | 280/731 |
| 5,524,923 | A * | 6/1996 | Henseler | 280/728.3 |
| 6,042,139 | A | 3/2000 | Knox | |
| 6,113,131 | A * | 9/2000 | Uehara et al. | 280/728.3 |
| 6,224,090 | B1 * | 5/2001 | Lutze et al. | 280/728.3 |
| 6,502,852 | B2 * | 1/2003 | Kassman et al. | 280/728.3 |
| 6,612,608 | B2 | 9/2003 | Schmidt et al. | |
| 6,733,032 | B2 * | 5/2004 | Pinsenschaum et al. | 280/728.3 |
| 2002/0121767 | A1 * | 9/2002 | Preisler et al. | 280/728.3 |
| 2002/0195800 | A1 * | 12/2002 | Florsheimer | 280/728.3 |
| 2004/0164531 | A1 * | 8/2004 | Riha et al. | 280/732 |
| 2005/0001410 | A1 * | 1/2005 | Evans | 280/728.3 |
| 2005/0046158 | A1 * | 3/2005 | Abe | 280/730.1 |
| 2005/0167956 | A1 * | 8/2005 | Yasuda et al. | 280/728.3 |
| 2005/0184488 | A1 * | 8/2005 | Yasuda et al. | 280/728.3 |
| 2006/0226638 | A1 * | 10/2006 | Yasuda et al. | 280/728.3 |
| 2006/0249931 | A1 * | 11/2006 | Nishijima et al. | 280/728.3 |
| 2006/0267314 | A1 * | 11/2006 | Yasuda et al. | 280/728.3 |
| 2006/0290110 | A1 * | 12/2006 | Diemer et al. | 280/728.3 |
| 2009/0267329 | A1 * | 10/2009 | Kalisz et al. | 280/728.3 |
| 2010/0013200 | A1 * | 1/2010 | Fukawatase et al. | 280/730.1 |
| 2010/0147129 | A1 * | 6/2010 | Kalisz et al. | 83/880 |

FOREIGN PATENT DOCUMENTS

| | | |
|---|---|---|
| JP | 2000-335349 | 12/2000 |
| JP | 2010-285021 | 12/2010 |

OTHER PUBLICATIONS

International Search Report for PCT application No. PCT/US2012/038530, dated Nov. 28, 2012, 3 pages.

* cited by examiner

*Primary Examiner* — Joseph Rocca
*Assistant Examiner* — Barry Gooden, Jr.
(74) *Attorney, Agent, or Firm* — Reising Ethington P.C.

(57) ABSTRACT

A panel for use over a vehicle airbag includes a skin layer with a plurality of stress concentrators formed in an inner surface in a uniform two-dimensional pattern. A deployment opening may be formed through the skin layer with no pre-determined tear seam location. Multiple possible tear seam locations may be defined along stress concentrators arranged in such patterns. One method of forming stress concentrators in the desired pattern or arrangement includes a calendering operation that may be the same or similar operation used to form decorative grain patterns on the outer surface of the skin layer.

14 Claims, 2 Drawing Sheets

PATTERNED WEAKENING OF AIRBAG COVERINGS

TECHNICAL FIELD

The present disclosure relates generally to vehicle airbag coverings and non-visible weakening of airbag coverings.

BACKGROUND OF THE INVENTION

Coverings used over vehicle airbags often include a tear seam to pre-determine the location of an airbag deployment opening formed through the covering during airbag deployment. Such a tear seam usually includes a weakened portion in the form of a notch, groove, cut, or score formed in a surface of the covering. This weakened portion typically forms an outline or perimeter of the pre-determined deployment opening location. For instance, a score line may be formed in a surface of the covering so that the path formed by the score line forms a shape that generally corresponds in shape and location with an underlying airbag door. When the airbag deploys, the covering tears along the score line to form the deployment opening with the perimeter of the opening at the location of the score line.

It may be more difficult to form tear seams in certain coverings than in others, depending on the type of covering materials, the dimensions of the covering, or the process used to form it. U.S. Pat. No. 7,128,334 to Leland et al. recognizes certain problems with forming tear seams in soft or elastomeric materials, including a tendency for such materials to self-heal. Leland identifies the angle of the sidewalls of the tear seam groove as a critical factor and purports to address that problem by cutting a tear seam with an ultrasonic knife. The knife is shaped to form a groove having a particular V-shaped cross-section to prevent the self-healing phenomenon. Leland does not address difficulties posed by relatively thin covering materials or alignment of the tear seam with other components.

SUMMARY OF THE INVENTION

According to one embodiment, a panel for use over a vehicle airbag includes a substrate having an outer surface and an airbag door region. The panel also includes a covering disposed over the substrate that includes a skin layer having an inner surface that faces toward the outer surface of the substrate. The panel further includes a plurality of stress concentrators formed in the inner surface of the skin layer and arranged along said inner surface in a pattern that at least partially defines a plurality of possible tear seam locations.

According to another embodiment, a method of making a panel for use over a vehicle airbag includes the steps of: (a) providing a substrate having an outer surface and an airbag door region; (b) forming a plurality of stress concentrators in an inner surface of a skin layer, the stress concentrators being arranged along said inner surface in a pattern that at least partially defines a plurality of possible tear seam locations; and (c) disposing the skin layer over the substrate so that the inner surface of the skin layer faces toward the outer surface of the substrate and the pattern at least partially overlaps the airbag door region.

DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The structures and methods described below are directed to different embodiments of panels and coverings for use over a vehicle airbag. Such panels may include coverings having a uniform pattern of stress concentrators formed in an inner surface. The pattern of stress concentrators may generally overlie and extend beyond an airbag door region of an underlying substrate so that alignment of the covering with the substrate is not critical for the proper formation of a deployment opening through the covering. In other words, the covering does not necessarily include any one particular tear seam location because the uniform pattern of stress concentrators can provide multiple possible tear seam locations, thus allowing the positioning of the covering over the substrate to determine exactly which stress concentrators will play a role in forming the airbag deployment opening through the covering. Because a deployment opening may be formed through some embodiments of the covering in nearly any shape, size, and/or location, such coverings may be used with multiple different panel substrates having airbag door regions of various shapes, sizes, configurations and locations. This can help eliminate the need to align a pre-formed covering tear seam with certain features of the underlying substrate during assembly. It may also help eliminate the need to form a tear seam in the substrate and/or covering after they are assembled. While presented using a vehicle passenger side airbag as an example of one type of airbag that may benefit from the following disclosure, any type of panel for use over a vehicle airbag may benefit from the teachings herein.

Figure 1:
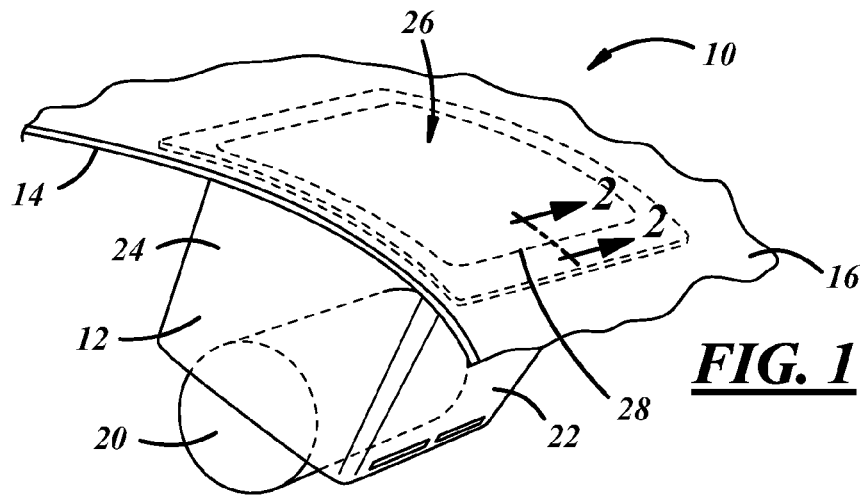
FIG. 1 is a cutaway view of an exemplary instrument panel with a covering arranged over an airbag module.

Referring to FIG. 1, a cut-away view of an exemplary vehicle instrument panel 10 is shown with an airbag module 12 installed therebeneath. The portion of instrument panel 10 shown is the passenger side of the instrument panel. Instrument panel 10 may include multiple layers of materials that may each include its own separately weakened portions provided for the formation of airbag deployment openings. In this embodiment, instrument panel 10 includes substrate 14, covering 16, and one or more stress concentrators (not shown in FIG. 1) formed in the covering. Examples of these various panel components and features will be described in further detail below.

Airbag module 12 is any component or device that includes an airbag arranged to deploy into the cabin of a vehicle when inflated. In this embodiment, airbag module 12 is a passenger airbag (PAB) module and includes an airbag canister 20 and a housing 22. The airbag canister 20 in this particular embodiment includes a folded or otherwise stowed airbag housed therein and is arranged and oriented such that when the airbag inflates, it extends away from the canister, toward the instrument panel 10, and toward the interior of the vehicle. Housing 22 is attached to the underside of instrument panel 10 and supports the airbag canister 20 beneath instrument panel 10. It may also include a chute 24 that helps to guide and control the direction of the airbag during deployment. This is of course only one version of an airbag module, while other modules may not include a canister or a separate housing and may include other types of components to compliment the functionality of the airbag.

Substrate 14 is the base component of instrument panel 10 to which other components may be attached and/or extend from for functional or aesthetic purposes, for example. A typical instrument panel substrate 14 may be constructed from a variety of materials depending on several design and cost considerations. Some exemplary substrate materials include rigid or semi-rigid thermoplastic materials such as polyolefin-based materials like thermoplastic olefins (TPOs) or polypropylene (PP). Other thermoplastic materials such as ABS or ABS/PC may also be used to form substrate 14. Thermoplastic materials may be filled or unfilled, depending on factors such as the required strength, stiffness, or toughness of the substrate. Suitable filler materials typically include short or long glass fibers or mineral-based fillers. Polypropylene having filler material including long glass fibers in an amount of 20-30% by weight is one example of a suitable substrate material, but other polymeric or non-polymeric materials may be used. The thickness of the substrate may depend on the type of material used to make it, but generally ranges from 2.0 mm to 4.0 mm for polymer-based materials.

Substrate 14 includes an airbag door region 26 having a boundary 28, as shown in the example of FIG. 1. Airbag door region 26 is a region in which an airbag door lies or in which an airbag door is formed during airbag deployment. In each of the following examples, the airbag door region 26 is represented by an opening that is formed through substrate 14 either before or after airbag deployment. In one embodiment, the air bag door is an integral part of or formed as one piece with substrate 14 with a continuous or discontinuous U-shaped slot formed through the substrate along three sides of a rectangle, for example, with the fourth side of the rectangle acting as a hinge for the door during airbag deployment. In this example, the rectangle corresponds to the airbag door region 26. In another embodiment, the airbag door region 26 is simply an opening formed through the substrate. In this embodiment, the airbag door may be a separate piece attached to the substrate in a manner that allows the door to swing open during airbag deployment, or the airbag door may be integrally formed with the underlying airbag module 12. In another embodiment, the air bag door is not formed until airbag deployment, and the airbag door region 26 is in the shape of a tear seam or pre-weakened portion of substrate 14 that determines the location of the door. Still other embodiments include a multi-layer airbag door having one layer integrally formed with or otherwise attached to the underlying airbag module 12 along with an overlying layer that is formed at a tear seam in the substrate 14. In the illustrated embodiment, substrate 14 includes a single airbag door region 26 that is generally rectangular. Other embodiments may include multiple airbag door regions and/or regions having other shapes. The number and shape of airbag door regions generally correspond with the number and shape of airbag doors that open during airbag deployment. For example, substrate 14 may include a tear seam, weakened portions, or one or more slots therethrough arranged in an H-shape so that top and bottom airbag doors open from within two corresponding rectangular airbag door regions. Or substrate 14 may include a tear seam or slots therethrough arranged in an X-shape so that four triangular airbag doors open from within four corresponding triangular airbag door regions.

Figure 2:
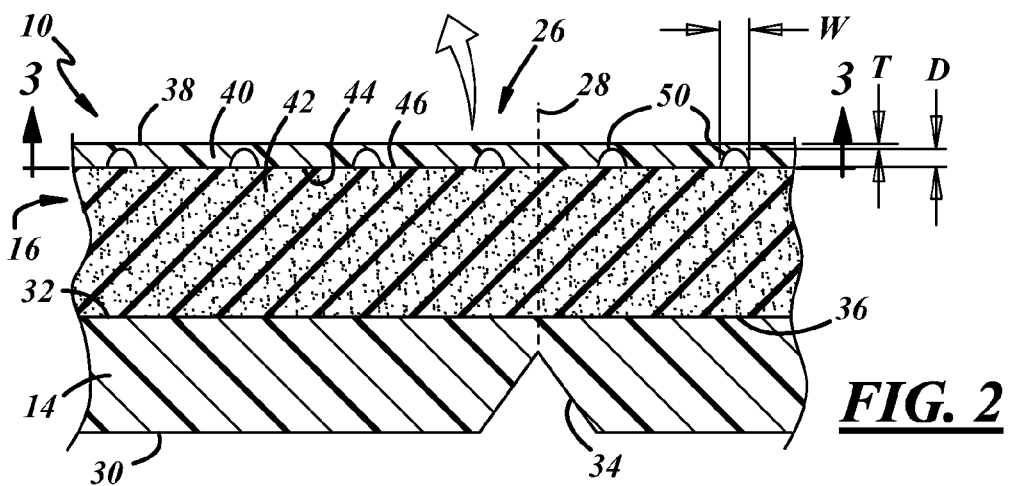
FIG. 2 is an enlarged cross-sectional view of a portion of the instrument panel of FIG. 1 showing stress concentrators formed in a skin layer of the covering.

FIG. 2 is a cross-section of a portion of panel 10 taken across boundary 28 of airbag door region 26 with airbag module 12 omitted. It is noted that neither FIG. 2 nor any of the other figures provided are necessarily to scale, and some dimensions may be exaggerated for explanatory purposes. Substrate 14 includes inner and outer surfaces 30 and 32. Outer surface 32 is covered by covering 16 and is therefore not visible to vehicle occupants, though it faces in a direction toward the vehicle cabin. In the embodiment shown, the substrate also includes a tear seam 34 having a notch-like cross-section that extends along surface 30 of the substrate in a path of a desired shape that at least partially defines the shape of airbag door region 26. The portion of the substrate on the inboard side (left side in the figure) of the tear seam 34 forms the airbag door that swings away from the substrate 14 in the direction of the arrow during airbag deployment.

Covering 16 overlies substrate 14 and is generally provided for decorative purposes, as it includes the visible surface of the instrument panel 10 in this embodiment. Covering 16 is typically, but not always, fabricated to be generally more flexible than substrate 14, either by making it from lower modulus materials, by making it thinner than the substrate, or both. Some exemplary covering materials will be presented below. Covering 16 may be adhesively attached to the outer surface 32 of the substrate 14 with a suitable adhesive, or it may be attached by other techniques such as having its edges wrapped around edges of the substrate 14 and attached to the inner surface 30, for example. In one embodiment, a thin layer of a spray-on adhesive formulated to be compatible with the substrate material and the facing covering material is sufficient for attachment.

Covering 16 includes an inner surface 36 and an opposite outer surface 38. Inner surface 36 faces toward, and may lie adjacent to, the outer surface 32 of substrate 14, and outer surface 38 faces toward the vehicle cabin. In the particular embodiment of FIG. 2, covering 16 is a bi-layer material that includes a skin layer 40 and an inner layer 42. Each of these layers has inner and outer surfaces facing the same respective directions as the inner and outer surfaces of covering 16. In the illustrated example, skin layer 40 includes inner surface 44 opposite its outer surface, which in this case is the same as outer surface 38 of the covering. Inner layer 42 includes outer surface 46 opposite its inner surface, which in this example is the same as inner surface 36 of the covering. Covering 16 is not limited to the bi-layer configuration shown and described. For example, skin layer 40 can itself be the covering in some embodiments. Covering 16 may also include more than two layers to provide a more complex tactile feel to the instrument panel, to include a bulk layer of inexpensive material, or for other reasons. Additional layers such as one or more adhesive layers or paint film layers may also be included with covering 16. The present disclosure is applicable to all instrument panels and other types of panels that may conceal an airbag, regardless of the number of layers.

Skin layer 40 provides the outer surface 38 of the covering, which in this case is the visible or show surface of the instrument panel. It may be formed from any of a variety of materials typically used in automobile interiors, including thermoplastic olefins (TPOs), thermoplastic elastomers (TPEs), plasticized polyvinylchloride (PVC), thermoplastic polyurethanes (PUR), leather, simulated leather, or any combination thereof. Material selection may be based on a number of factors, including the desired type of texture for outer surface 38, the tactile "feel" of the material, cost, processability, etc. Olefin-based materials such as TPOs or other polymers based on ethylene, propylene, butylene, butadiene, or blends, alloys, or copolymers thereof may be preferred due to their low cost, low density, and wide available ranges of properties. Skin layer 40 may range in thickness from about 0.2 mm to about 1.0 mm, and preferably ranges from about 0.3 mm to about 0.7 mm. The thickness of layer 40 may depend on material choice and other factors, such as whether covering 16 is a multi-layer component as shown in this example. For example, in a different embodiment, covering 16 may include only a single layer of material, such as skin layer 40, in which case the thickness may be selected near the higher end of the range to provide sufficient material thickness for the stress concentrators described herein.

Inner layer 42, as provided in the illustrated embodiment, lies between substrate 14 and skin layer 40. Inner layer 42 may be included to provide a different tactile "feel" to the covering 16 and to the overall instrument panel than if the skin layer 40 were attached directly to the more rigid substrate 14. Layer 42 may also be included as an intermediate layer that aids in attachment of the skin layer 40 to the substrate by providing a material that can be sufficiently adhered to both the skin layer 40 and the substrate 14. Layer 42 may be separately adhered, co-extruded, laminated, or otherwise attached to skin layer 40 to form covering 16 as a unitary component, or layer 42 may be a separate layer altogether. Inner layer 42 can include other functionality as well, such as leveling uneven areas in the underlying substrate, helping to conceal substrate features, and providing generally more structure to coverings that utilize skin layers that may be too thin and/or flexible to be practical for use in a manufacturing environment. In one embodiment, inner layer 42 may be formed in place by disposing an expandable material such as polyurethane foam between skin layer 40 and substrate 14.

In the illustrated embodiment, inner layer 42 provides the inner surface 36 of the covering, which is adjacent and facing the substrate 14. It may be formed from any of a variety of materials, but polymeric foam materials may be preferred to provide a soft but resilient feel to the instrument panel. Exemplary materials for inner layer 42 may include nearly any type of polymer foam. Polyolefin-based foams may be used, including foam materials based on polyethylene (PE), polypropylene (PP), TPOs, or alloys or blends thereof, such as a PE/PP alloy. Other types of polymer foams include polyurethane foam, acrylic-based foams, and polyester foams, to name a few. Some of these materials may be cross-linked for additional resilience, and they may include open- or closed-cell structures. Other non-foam materials such as felt or textile fibers may be used as well. Inner layer 42 may range in thickness from about 0.5 mm up to about 5.0 mm or higher, depending on the desired "feel" of the instrument panel, for example. A more typical inner layer thickness may be chosen to provide an overall covering thickness that ranges from about 1.0 mm to about 4.0 mm. For example, in one embodiment, covering 16 has an overall thickness of about 2.0 mm, where the skin layer 40 is about 1.0 mm thick and the inner layer 42 is about 1.0 mm thick. In another embodiment, the skin layer is about 0.5 mm thick, and the inner layer is about 3.5 mm thick, so that the overall covering thickness is about 4.0 mm. Of course, these are non-limiting examples, as there are several suitable combinations of layer thicknesses.

As previously noted, instrument panel 10 includes one or more stress concentrators 50 formed in the inner surface 44 of skin layer 40. As used herein, a stress concentrator is a feature that locally increases the stress level in the layer in which it is formed relative to immediately adjacent areas of the same layer when a force is applied to the layer. An individual stress concentrator may be nearly any shape or size within the confines of the layer in which it is formed. For example, tear seam 34 is a stress concentrator for the substrate layer of FIG. 2 and is in the form of a groove or recess having a triangular, notch-like cross-section formed in inner surface 30. It concentrates stress at the apex of the triangular notch by locally reducing the thickness, and thereby the cross-sectional area, of the substrate. When a force is applied to the substrate, as is the case during airbag deployment, the resulting stress is maximized at the minimum substrate wall thickness above the stress concentrator. Thus, in the case of substrate 14, the stress concentrator is used to pre-define the location of the airbag door formed during airbag deployment, the deployment opening, and the corresponding airbag door region 26.

The cross-section shown in FIG. 2 is taken along a row of discrete stress concentrators 50. Each of the depicted stress concentrators 50 in this example is a recess formed in surface 44 and may be arranged as part of a two-dimensional pattern along inner surface 44. Examples of patterns and other types of stress concentrators will be described below. In the illustrated embodiment, recesses 50 are equally spaced and each recess 50 is substantially the same size and characterized by a width W, a depth D, and a corresponding residual wall thickness T. Of course, individual stress concentrators may be different sizes and may be spaced from other stress concentrators by different amounts. Width W may be a diameter when the recess has a circular cross-section and may range from 0.1 mm to about 0.5 mm, but may vary widely or fall outside of that range depending of the geometry of the stress concentrator. For example, a stress concentrator may be in the form of a slit having a length and a width where the width is essentially zero. A preferred range for the width of exemplary recesses 50 ranges from about 0.2 mm to about 0.3 mm. Depth D may be determined by the desired residual wall thickness T at each stress concentrator such that D is equal to the difference between the local thickness of the skin layer and the desired residual wall thickness T.

Residual wall thickness T may range from about 0.1 mm to about 0.5 mm depending on the skin layer material type, stress concentrator spacing, and other factors. For example, it may be desired to minimize thickness T to maximize stress concentrator function. In other words, the lower the residual wall thickness, the higher the stress concentration and the easier the skin layer will tear to form a deployment opening having a boundary through the stress concentrator. However, when thickness T is too small, particularly with highly flexible materials such as certain TPO formulations, sagging of the skin layer over time, visual read-through, or witness marks may result. These types of visual defects may be undesirable on the outer surface of an instrument panel covering. Thus, thickness T may be selected to both maximize tear seam function (thinner is better) and minimize visual defects such as stress concentrator read-through (thicker is better). With skin layers constructed from high elongation materials, such as certain TPO formulations, if T is too large, the skin layer may not tear to form a deployment opening. Because T has opposite effects on the read-through problem and proper tear seam function, the acceptable range in practice may be relatively small. A preferred range for thickness T may be from about 0.2 mm to about 0.3 mm, but T may fall outside of that range depending of the geometry of the stress concentrator, material types, or other factors. For example, a stress concentrator may be in the form of a micro-perforation hole that extends completely through skin layer 40 and has a width or diameter sufficiently small to be visually undetectable.

One way to facilitate the use of stress concentrators in skin layer 40 that have corresponding residual wall thicknesses at the lower end of the above-described preferred range, or possibly lower, is to provide support beneath each stress concentrator 50. An example of such support is shown in the embodiment of FIG. 2 where each of the opposite surfaces 36 and 46 of inner layer 42 is continuous or unbroken beneath each of the stress concentrators 50. This may be accomplished by forming the stress concentrators in the skin layer prior to disposing it over or attaching it to the inner layer. In one embodiment, at least one of the inner or outer surfaces 36 or 46, preferably outer surface 46, is continuous beneath each stress concentrator 50. Stress concentrators 50 may be formed in skin layer 40 by a variety of techniques including mechanical forming techniques, such as calendering, or cutting techniques such as machining, hot or cold knife cutting, or laser cutting, to name a few. While in the embodiment shown in FIG. 2, the stress concentrators 50 are formed in the skin layer 40 before it is disposed over the inner layer 42, they may also be formed after the inner layer 42 and skin layer 40 are attached to each another or after the covering 16 is disposed over the substrate 14 by cutting or forming through the additional layers.

Figure 3:
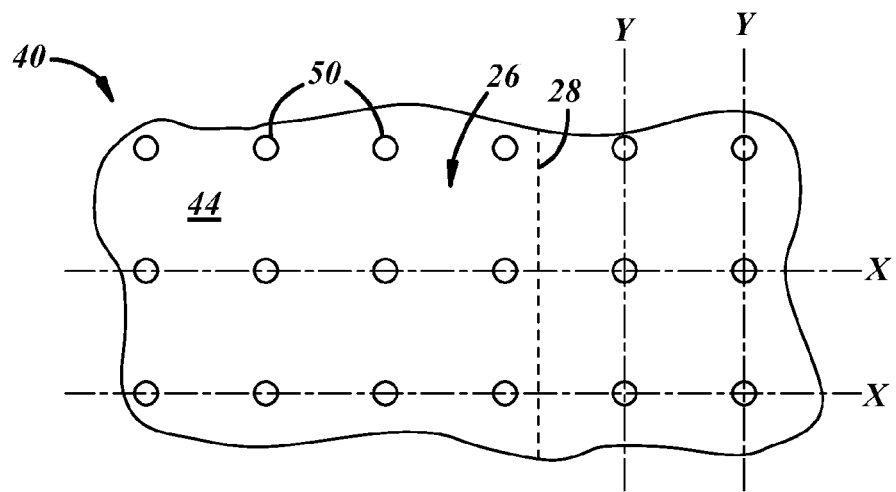
FIG. 3 is a plan view of the inner surface of the skin layer of FIG. 2, showing the stress concentrators arranged in a uniform two-dimensional pattern.

FIG. 3 shows inner surface 44 of the portion of exemplary skin layer 40 shown in FIG. 2 with the substrate and inner layer omitted. A portion of boundary 28 of airbag door region 26 is also represented in FIG. 3. In this embodiment, a plurality of discrete stress concentrators 50 is formed in inner surface 44. The stress concentrators 50 are arranged in a pattern, as shown. The particular pattern depicted in FIG. 3 is a grid-like pattern that includes a plurality of parallel rows X of stress concentrators oriented in one direction (horizontal in the figure) and a plurality of parallel rows Y of stress concentrators oriented in a different direction (vertical in the figure) that is perpendicular to the direction of rows X. In one embodiment, the grid spacing, or distance between consecutive stress concentrators along row X, row Y, or both, ranges from about 2.0 mm to about 4.0 mm and preferably ranges from about 2.5 mm to about 3.5 mm with a nominal value of about 3.0 mm. Of course, with a grid-like pattern as shown, other parallel rows of stress concentrators may be defined in other directions as well.

More broadly described, the pattern depicted in FIG. 3 is a uniform two-dimensional pattern. As used herein, the term "uniform" indicates that along any definable row of stress concentrators, the distance from one stress concentrator in the row to the next stress concentrator in the row is the same for all stress concentrators in the row. The term "two-dimensional," as used herein in the context of stress concentrator patterns, is meant to indicate that not all of the stress concentrators in the pattern are arranged along a single line or row.

Figure 4:
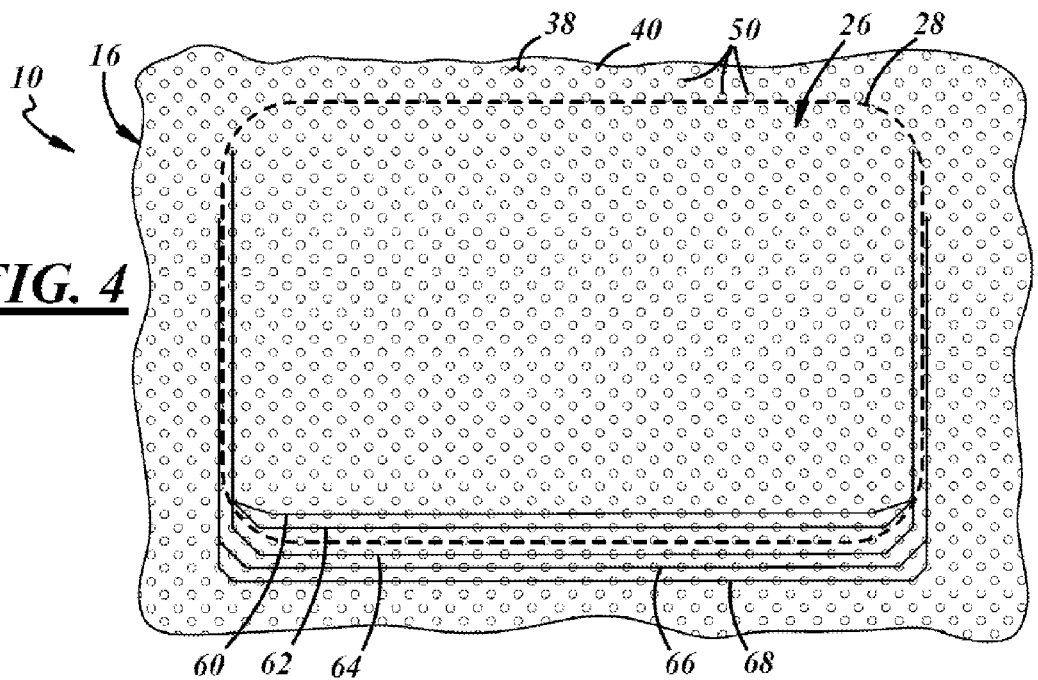
FIG. 4 is a schematic view of a portion of a covering and an airbag door region showing a uniform two-dimensional pattern of stress concentrator locations and possible tear seam locations.

FIG. 4 depicts one embodiment of an instrument panel 10 that includes a covering 16 having a pattern of stress concentrators 50 formed in the skin layer 40. FIG. 4 is a view of the outer surface 38 of covering 16, or more particularly of skin layer 40. The covering is disposed over airbag door region 26 and its boundary 28, shown as a dashed line. Each circle of the pattern of circles shown in FIG. 4 is meant to depict the location of a stress concentrator 50 formed in the inner surface of skin layer 40. While the stress concentrators 50 are not visible while viewing outer surface 38, their locations are shown in FIG. 4 for illustrative purposes, particularly in relation to airbag door region 26. In this embodiment, the stress concentrators 50 are arranged in a uniform two-dimensional pattern. It is a grid-like pattern and oriented slightly different than in the skin layer of FIG. 3 in relation to the airbag door region 26 and boundary 28. In the embodiment of FIG. 4, the pattern of stress concentrators 50 is arranged so that it spans the entire airbag door region 26, extending beyond region 26, or across boundary 28, in multiple directions. In other embodiments, the pattern may span airbag door region 26 in one or more directions. For example, the pattern may span region 26 in a transverse direction (left-right in the figure), in a longitudinal direction (up-down in the figure), or in some other direction and does not necessarily cover the entire region 26.

One characteristic of the pattern of stress concentrators shown in FIG. 4 is that any plurality of the stress concentrators may define at least a portion of a possible tear seam location. Possible tear seam locations 60-68 are illustrated in the figure, but skilled artisans will appreciate that possible tear seam locations, shapes, and sizes are nearly limitless with the pattern of stress concentrators shown in FIG. 4. Providing this or another type of pattern of stress concentrators in skin layer 40 facilitates the construction of a skin layer or covering that does not necessarily have a pre-determined tear seam location, particularly where the stress concentrators are provided in a region of the skin layer that is substantially larger than the airbag region it will cover. In other words, the skin layer or covering may be disposed over the airbag region in practically any position or orientation without regard for alignment of any feature of the covering with any feature of the underlying substrate while providing proper tear seam function in the skin layer—i.e., a deployment opening can be formed through the skin layer during airbag deployment. Thus, a skin layer or covering having a pattern of stress concentrators such as some of the patterns described herein may be used over multiple different substrates with multiple different airbag region locations, shapes, or sizes.

Providing multiple possible tear seam locations in skin layer 40 allows the geometry of and the various material properties of the instrument panel components to determine the location of the tear seam upon airbag deployment. For example, airbag deployment experiments have been conducted indicating that, with certain instrument panel and airbag configurations, stress levels in the covering 16 and/or the skin layer 40 are higher in a region slightly outboard of region boundary 28 than stress levels inboard of the boundary. Exactly how far outboard the stresses are maximized may not be known but is irrelevant with multiple tear seam locations provided by the stress concentrator locations. This improves tear seam function, particularly with difficult-to-tear or high elongation skin layer materials, by causing the covering to tear and form a deployment opening at the highest stress location without knowing the exact location ahead of time. Certain instrument panel configurations may include airbag deployments such that the highest stress region is inboard of boundary 28 or in alignment with the boundary, and the stress concentrator arrangements described herein can accommodate such scenarios.

As will be further described, the stress concentrator pattern does not necessarily have to span the entire airbag region 26 in any direction to realize the advantages of multiple possible tear seam locations. In one embodiment, a stress concentrator pattern is provided so that at least some of the stress concentrators are located both inside and outside of the airbag door region. For example, the pattern may simply include stress concentrators arranged to form portions of possible tear seam locations 62 and 64, inside and outside of airbag region 26, respectively. The pattern of stress concentrators that form locations 62 and 64 are arranged in substantially parallel rows that follow the curvature of at least a portion of boundary 28, where the curvature is zero along straight portions of locations 62 and 64. The pattern may be arranged to form any number of possible tear seam locations that follow the curvature of any portion of boundary 28. It is noted that the spacing between stress concentrator locations depicted in FIG. 4 is exaggerated for clarity. For instance, in some embodiments, a portion of a covering such as that shown in FIG. 4 will include three to four times the number of stress concentrator locations within the same area, allowing possible tear seam locations to more closely follow the curvature of boundary 28 than is shown in the example of FIG. 4.

Figure 5:
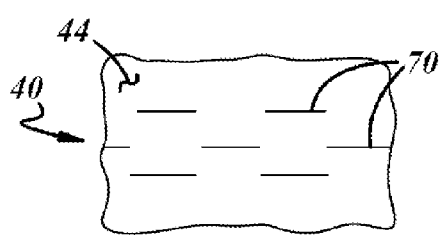
FIG. 5 is a view of the inner surface of a portion of an exemplary skin layer including discrete stress concentrators in the form of slits.

FIGS. 5-9 illustrate some examples of stress concentrators and patterns of stress concentrators for use with the coverings disclosed herein. FIG. 5 is a plan view of inner surface 44 of an exemplary skin layer 40 showing discrete stress concentrators in the form of slits 70. As used herein, the term "discrete" where used to describe stress concentrators means that each stress concentrator is separate from others. For example, no portions of individual stress concentrators 70 touch or overlap. This is also the case with discrete recesses 50 of FIGS. 2 and 3. Stress concentrators 70 are arranged in a uniform two-dimensional pattern that includes three substantially parallel rows of slits.

Figure 7:
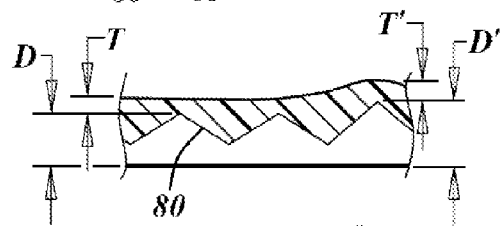
FIG. 7 is a cross-sectional view of the stress concentrators of FIG. 6.
Figure 6:
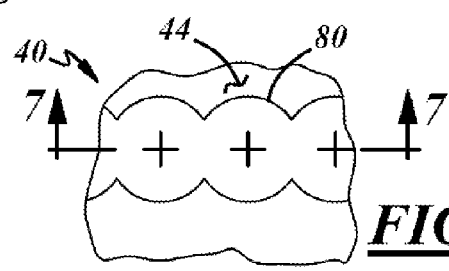
FIG. 6 is a view of the inner surface of a portion of another exemplary skin layer including stress concentrators in the form of conical recesses.

FIGS. 6 and 7 show another example of stress concentrators that may be formed in the inner surface 44 of skin layer 40. Stress concentrators 80 are in the form of conical-like recesses 80. In this example, the individual conical recesses 80 touch or have portions that overlap or intersect one another. Recesses 80 are therefore not considered discrete stress concentrators, but are still considered individual stress concentrators because each of the recesses 80 concentrates stress at a different location (the apex of the cone where T is minimized as shown in FIG. 7). Stress concentrators 80 are also arranged in a uniform pattern.

Figure 8:
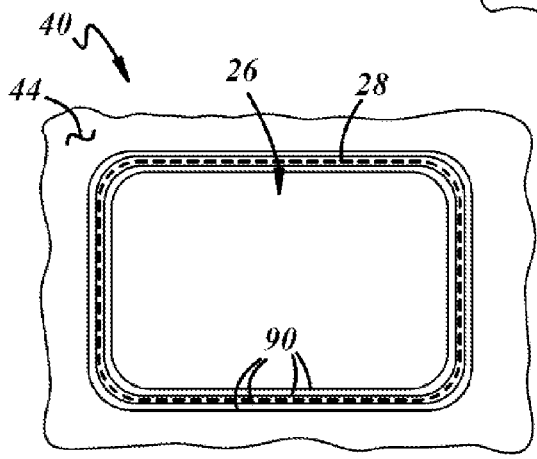
FIG. 8 is a view of the inner surface of a portion of another exemplary skin layer including discrete stress concentrators arranged in a pattern with respect to an airbag door region.

FIG. 8 shows a plurality of discrete stress concentrators 90, each in the form of a continuous groove, slit, notch, or score line formed in surface 44. In this embodiment, stress concentrators 90 generally follow the curvature of boundary 28 of region 26. Stress concentrators 90 are similar to that formed in the substrate in FIG. 2, but are formed in skin layer 40 instead. A plurality of stress concentrators 90 is included in a pattern that may realize at least some of the above-described advantages of multiple possible tear seam locations. The individual stress concentrators 90 are arranged in a nested pattern in this example, with one or more of the stress concentrators being located within the airbag door region 26 and one or more being located outside of the region 26. Other embodiments may include individual stress concentrators 90 that cross from one side of boundary 28 to the other. Still other embodiments may substitute a plurality of discrete, equally spaced recesses, such as recesses 50 shown in FIGS. 2 and 3, in place of and arranged along the same path as one or more of the stress concentrators 90 shown in FIG. 8.

Figure 9:
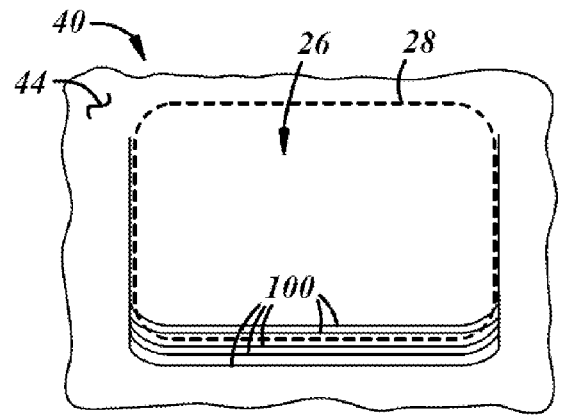
FIG. 9 is a view of the inner surface of a portion of another exemplary skin layer including stress concentrators arranged in a pattern with respect to an airbag door region.

FIG. 9 also includes a plurality of stress concentrators 100, each in the form of a continuous groove, slit, or notch formed in surface 44. In this embodiment, stress concentrators 100 also generally follow the curvature of boundary 28 of region 26. Each stress concentrator 100 is joined along common parallel portions (shown vertical in the figure) and included in a uniform pattern to realize at least some of the above-described advantages of multiple possible tear seam locations. The stress concentrators 100 are arranged so that at least a portion of one or more of the stress concentrators 100 is located within the airbag door region 26 and at least a portion of one or more of the stress concentrators 100 is located outside of the region 26.

A method of making a panel such as an instrument panel having a covering as described above may also be described and generally includes the steps of providing a substrate, forming a plurality of stress concentrators in an inner surface of the covering or a skin layer of the covering, and disposing the skin layer or covering over the substrate. The substrate includes an outer surface and an airbag door region, and the inner surface of the skin layer or covering faces toward the outer surface of the substrate when disposed thereover. The stress concentrators may be arranged along the inner surface of the covering or skin layer in a pattern, and the pattern may be uniform, two-dimensional, and/or at least partially define a plurality of possible tear seam locations. The covering or skin layer is disposed over the substrate so that one or more of the stress concentrators are located inside of the airbag door region and one or more of the stress concentrators are located outside of the airbag door region or so that the pattern of stress concentrators at least partially overlaps the airbag door region.

In one embodiment, the step of forming the plurality of stress concentrators includes a calendering operation or other form of mechanical operation that reshapes or displaces material. Calendering operations are known in the art to provide decorative grain patterns, for example, on the outer surface of skin layers that may be used in instrument panel coverings and include pressing and feeding skin layer material between rotating rollers. The roller surfaces may include raised or depressed features formed therein so that corresponding depressed or raised features are formed in the skin layer material. It has been realized that a process similar to that used in the formation of decorative grain pattern for display on the outer surface of the skin layer may be used simultaneously, consecutively, or at least within the same type of manufacturing equipment to form the functional stress concentrators described above in the inner surface of the skin layer. This may be advantageous for a variety of reasons, including the reduction of the number of manufacturing processes and/or types of manufacturing equipment required to form the skin layer, covering, and panel. Additionally, where it is possible to coordinate the rollers in a calendering operation, stress concentrator depth can be controlled and coordinated with decorative grain depth in the opposite surface of the skin layer so that the residual wall thickness may be constant regardless of whether the stress concentrator is formed directly opposite a grain feature. In other words, where grain features of a certain depth are being formed by one roller in the outer surface of the skin layer, that depth can be accounted for by the other roller being configured to form the corresponding stress concentrator with a depth that results in the desired residual wall thickness, which may be a depth that is different than other stress concentrator depths. See FIG. 7, where T=T' and D≠D', for example.

Calendering may be particularly suitable for forming stress concentrators in relatively thin skin layers, such as skin layers having a thickness that is less than 0.5 mm. These types of thin skin layers sometimes pose difficulties with secondary operations that include forming stress concentrators using cutting techniques where process variation in the cut depth can be a large portion of the overall thickness and of the desired residual wall thickness. However, methods other than calendering may be used in some instances to form arrangements of stress concentrators that realize some of the other advantages disclosed above. For example, a grid of laser or other types of cuts may be made in a pattern in the inner surface of the skin layer or through an inner layer attached to the skin layer.

In one embodiment, the step of forming the stress concentrators includes forming the pattern of stress concentrators along substantially the entire portion of the inner surface of the skin layer that overlies the substrate in the disposing step. In another embodiment, an inner layer may be attached to the inner surface of the skin layer prior to disposing the skin layer over the substrate, but this is not always the case. It is possible, for example, that the formed skin layer is disposed over the substrate prior to the inner layer being attached, as is the case when an expandable foam material is backfilled or injected between the skin layer after it is disposed over the substrate.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A panel for use over a vehicle airbag, comprising:
a substrate having an outer surface and an airbag door region;
a covering disposed over the substrate, the covering including a skin layer having an inner surface that faces toward the outer surface of the substrate; and
a plurality of stress concentrators formed in the inner surface of the skin layer and arranged along said inner surface in a pattern that at least partially defines a plurality of possible tear seam locations, wherein at least some of the plurality of stress concentrators have different depths from one another and define substantially the same residual wall thickness as one another.

2. A panel as defined in claim 1, wherein the pattern includes a uniform two-dimensional pattern.

3. A panel as defined in claim 1, wherein the pattern includes a grid pattern.

4. A panel as defined in claim 1, wherein at least a portion of one possible tear seam location lies over the airbag door region and at least a portion of another possible tear seam location lies outside of the airbag door region.

5. A panel as defined in claim 1, wherein the covering further comprises an inner layer disposed between the substrate and the skin layer, the inner layer having opposite surfaces and at least one of said opposite surfaces being continuous beneath each of the plurality of stress concentrators.

6. A panel as defined in claim 1, wherein the plurality of stress concentrators is arranged so that the pattern includes two or more substantially parallel rows in a first direction and two or more substantially parallel rows in a second direction that is not parallel to the first direction.

7. A panel as defined in claim 1, wherein the pattern spans the airbag door region in at least one direction.

8. A panel as defined in claim 1, wherein the pattern spans substantially the entire airbag door region and extends beyond the airbag door region in more than one direction.

9. A panel as defined in claim 1, wherein each of the plurality of stress concentrators is a discrete recess.

10. A panel as defined in claim 1, wherein the plurality of stress concentrators includes a stress concentrator in the form of a groove, slit, notch, or score line that follows the curvature of a boundary of the airbag door region.

11. A method of making a panel for use over a vehicle airbag, comprising the steps of:
(a) providing a substrate having an outer surface and an airbag door region;
(b) forming a plurality of stress concentrators in an inner surface of a skin layer, the stress concentrators being arranged along said inner surface in a pattern that at least partially defines a plurality of possible tear seam locations, wherein at least some of the plurality of stress concentrators are formed to have different depths from one another and to define substantially the same residual wall thickness as one another; and
(c) disposing the skin layer over the substrate so that the inner surface of the skin layer faces toward the outer surface of the substrate and the pattern at least partially overlaps the airbag door region.

12. The method of claim 11, wherein step (b) includes a calendering operation.

13. The method of claim 11, wherein step (b) includes forming the pattern of stress concentrators in a grid pattern along substantially an entire portion of the inner surface of the skin layer that overlies the substrate in step (c).

14. The method of claim 11, further comprising the step of attaching an inner layer to the inner surface of the skin layer after step (b) and before step (c).

* * * * *